No. 644,950. Patented Mar. 6, 1900.
J. E. THORNTON & J. P. LEA.
MOTOR DRIVEN VEHICLE.
(Application filed Dec. 29, 1897.)

(No Model.) 3 Sheets—Sheet 1.

WITNESSES
INVENTORS

No. 644,950. Patented Mar. 6, 1900.
J. E. THORNTON & J. P. LEA.
MOTOR DRIVEN VEHICLE.
(Application filed Dec. 29, 1897.)
(No Model.) 3 Sheets—Sheet 3.

WITNESSES
Joseph Bates
C. Howard

INVENTORS
J. E. Thornton
J. P. Lea
by Dowden O'Brien
atty.

UNITED STATES PATENT OFFICE.

JOHN E. THORNTON AND JAMES P. LEA, OF ALTRINGHAM, ENGLAND.

MOTOR-DRIVEN VEHICLE.

SPECIFICATION forming part of Letters Patent No. 644,950, dated March 6, 1900.

Application filed December 29, 1897. Serial No. 664,463. (No model.)

*To all whom it may concern:*

Be it known that we, JOHN EDWARD THORNTON and JAMES POLLARD LEA, subjects of the Queen of Great Britain, and residents of Altringham, in the county of Chester, England, have invented certain new and useful Improvements in Motor-Driven Vehicles, (for which we have obtained British Letters Patent No. 8,819, of 1897,) of which the following is a specification.

This invention is designed to provide suitable means for driving vehicles and for connecting the motor parts with the vehicle, whereby the weight of the load is more or less directly applied, as may be required, to the driving-wheel of the apparatus.

It will be fully described with reference to the accompanying drawings.

Figure 1:
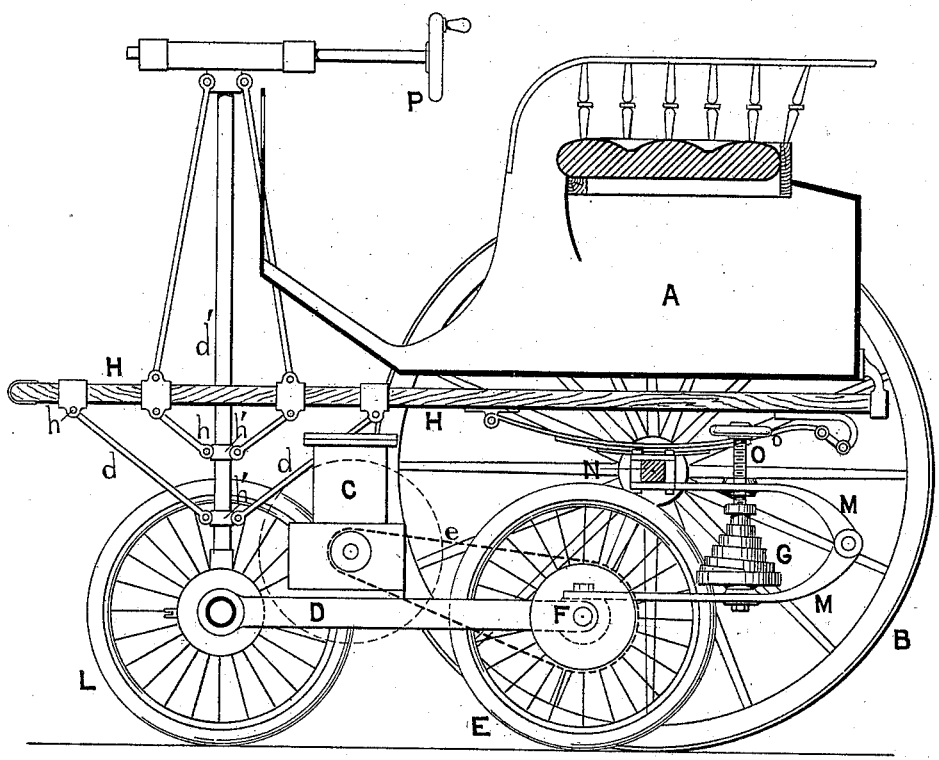
Figure 2:
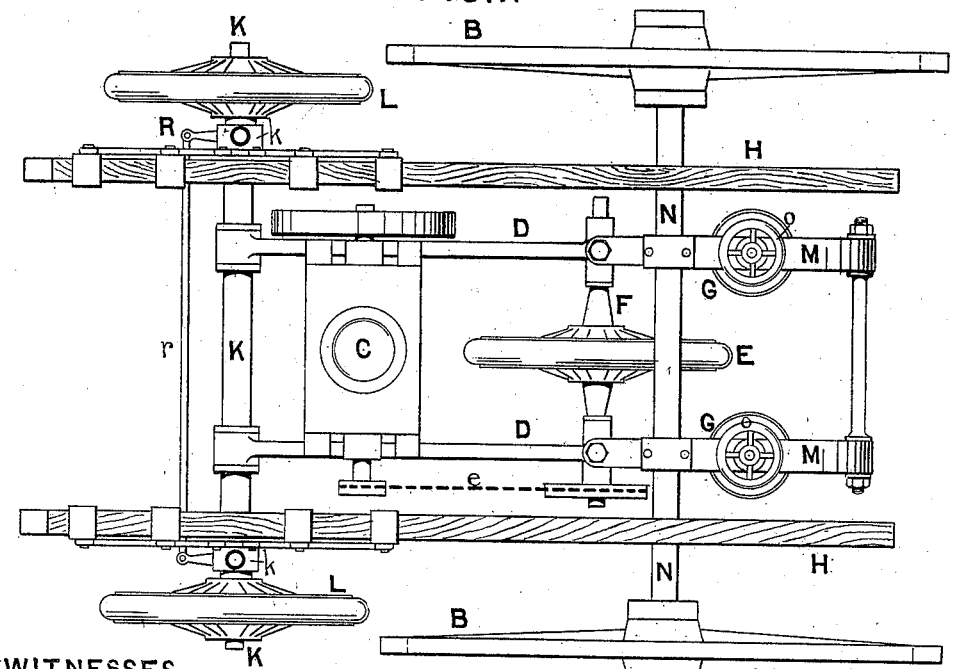
Figure 3:
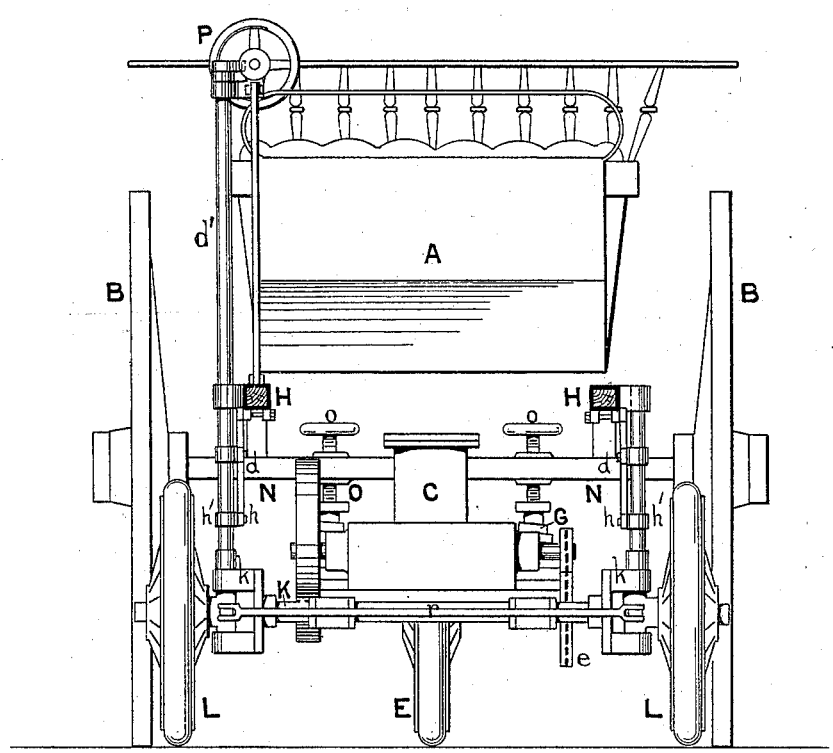
Figure 4:
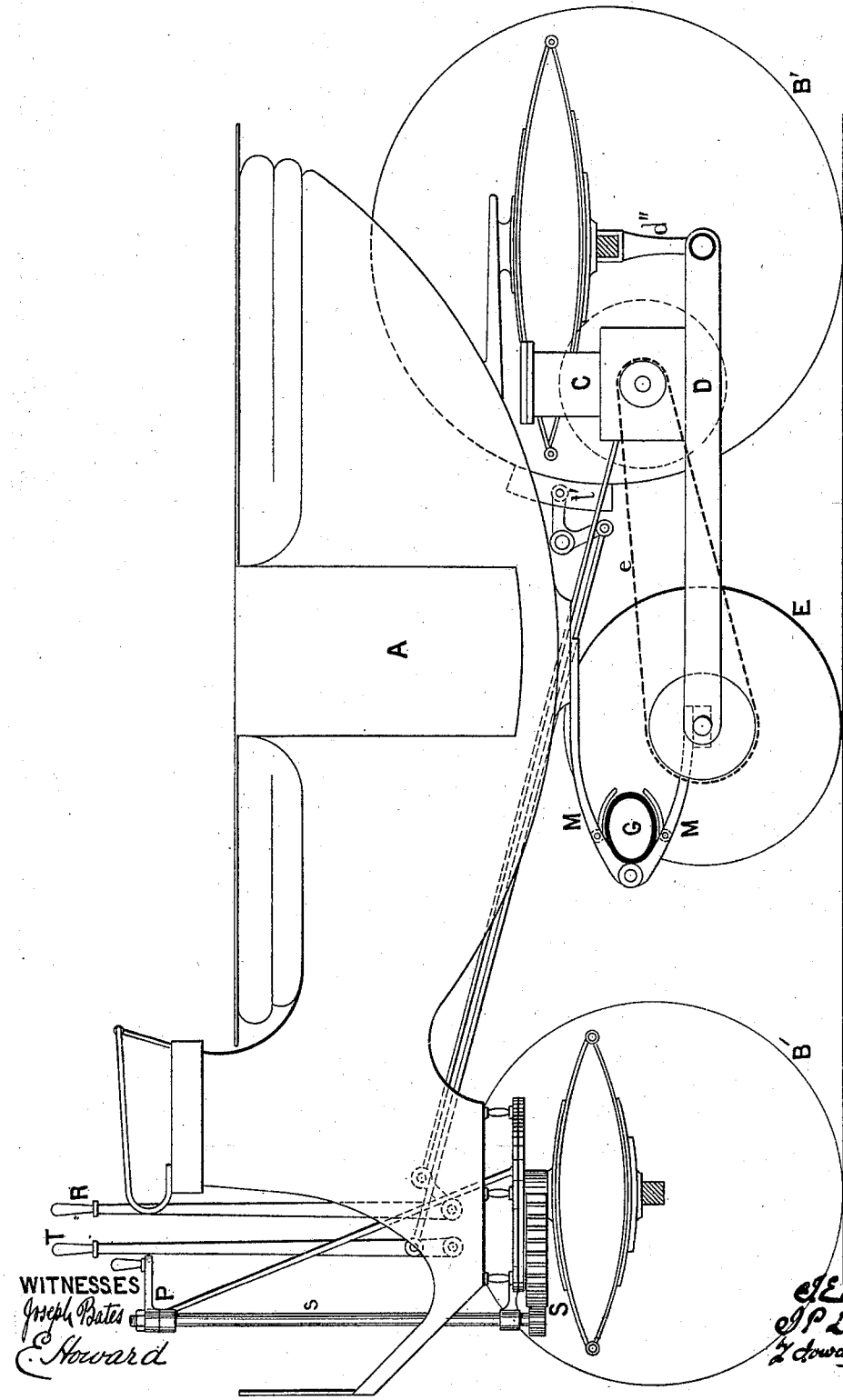

Figure 1 is a side elevation showing the invention applied to a two-wheeled vehicle; Fig. 2, a plan of same; Fig. 3, a front elevation of same; Fig. 4, a side elevation of a four-wheeled vehicle.

The body A of the carriage is of any ordinary shape or construction, supported, as in Figs. 1 to 3, on two wheels B of ordinary construction for road-vehicles, or supported, as in Fig. 4, on four wheels B'.

The motor C, which is also of any ordinary or suitable construction, (actuated by steam, oil, gas, hot air, or vapor,) is mounted on a framing D, constructed to carry it.

The framing D is hinged or pivoted at one end so as to admit of sufficient movement at the other, carrying the driving-wheel, to follow any inequalities of the road.

The framing D carries a driving or propelling wheel E, journaled upon a spindle or shaft F, firmly attached to the frame D, and is connected to the body of the vehicle at one end by a spring or springs G. The spring G may be made of steel and of volute or other form or may be an inflated rubber cushion and is provided with a spring or other adjustment, whereby the tension or compression of the spring is adjusted to correspond with and transmit any required portion of the weight of the vehicle or the load within it to the driving-wheel.

The driving or propelling wheel E is preferably provided with a rubber tire (or other suitable tire) and is driven from the motor C by a chain e or other suitable gearing. It is in all cases placed under the body of the vehicle, so as to directly receive the weight, the springs G determining the amount of pressure by which it is pressed against the ground, the vehicle-wheels B sustaining the rest of the weight and load.

Referring to Figs. 1 to 3, the invention is shown applied to a two-wheeled vehicle, such as a cart or gig, the shafts H of the vehicle having been shortened, so as not to project unduly. In this case the frame D is provided at the back with the driving-wheel E and at the front with an axle or spindle K with two wheels L, to which it is pivoted. The wheels L rotate on the axles K', which swivel upon the pivots k, connected to the axle K to allow the wheels to swivel for the purpose of steering or turning the vehicle. The axle K, carrying the axles K' and steering-wheels L, is attached to the shafts H by stays d, which are pivoted at both ends on the pins h to permit of them being adjusted to the height of any vehicle, the brackets h' being also adjustable on the upright rods d'. To the rear end of the frame D two jointed levers or bracket-arms M are attached by one end, the other end of the levers M being attached to the axle N or other part of the vehicle. Between the two ends of each of the jointed levers M is inserted the volute spring G, the tension of which is adjusted by the screw O and hand-wheel o. Instead of volute springs a pneumatic cushion may be employed, as shown in Fig. 4. The driving-wheel E is actuated from the motor C by the chain e, and the steering-wheels L are moved to right and left, as required, by the handle P. A single central front steering-wheel may be substituted for the two wheels L.

Referring to Fig. 4, the invention is shown applied to a four-wheel carriage, the body of which may be of any shape or design. In this case the frame D is provided, preferably, with only the single driving-wheel E, as the front wheels of the carriage serve for steering and turning. One end of the frame D is connected to the back axle by connecting rods or links d'' and the other end is attached to the body of the vehicle by the two jointed levers or bracket-arms M, and one end of the levers M being attached to the frame D and the other end to the vehicle. Between the ends of each of the jointed levers M is inserted pneumatic spring G, the tension of which is regulated by the amount of inflation. Instead of the pneumatic spring a volute spring, as in Fig. 1, may be employed. For four-wheeled vehicles we prefer the arrangement shown in Fig. 4; but, if desired, the position of the frame D may be reversed, as shown in Fig. 1, the levers M being connected with the back axle. The driving-wheel is actuated from the motor C by the chain $e$ or other gearing. The vehicle is steered by the two front wheels B, which are swiveled by a quadrant S, which is rotated in either direction by a pinion-rod $s$ and handle or lever P. A hand-lever R and connecting-rod $r$ control the motor C and a brake-lever T operates the brake $t'$.

In either arrangement the said motor and driving-wheel may be permanently connected with the vehicle to be driven or it may be arranged that such motor and driving-wheel may be detachable from and attachable to each of several vehicles.

What we claim as our invention, and desire to protect by Letters Patent, is—

1. In a motor-driven vehicle the combination with the body and ordinary wheels, of a traction-frame hinged to the axle by a pivoted joint, a motor and traction-wheel carried by the traction-frame, pivoted connecting-levers by which the traction-frame is connected at its other end to the vehicle and a spring inserted between the levers to regulate the pressure of the traction-wheel upon the ground substantially as described.

2. In a motor-driven vehicle the combination with the body A shafts H upon which the body of the vehicle is mounted and wheels B, of the traction-frame D provided with traction-wheel E and guiding-wheel L and motor C the jointed levers M connecting the body of the carriage with the traction-frame the spring for regulating the pressure of the traction-wheel upon the ground and the adjusting-screw O substantially as described.

3. In a motor-driven vehicle the combination with the vehicle-body the ordinary wheels and a traction-frame and traction-wheel journaled therein of two pivoted connecting-levers one end attached to the traction-frame and the other to the vehicle by which the traction-frame is attached to the body and a spring inserted between such levers to adjust the pressure of the traction-wheel upon the ground substantially as described.

In testimony whereof we have signed our names to this specification in the presence of two subscribing witnesses.

J. E. THORNTON.
J. P. LEA.

Witnesses:
J. OWDEN O'BRIEN,
R. OVENDALE.